Feb. 24, 1942.   I. SKLENÁR   2,273,900
INTERNAL COMBUSTION ENGINE
Filed Feb. 2, 1938   2 Sheets-Sheet 2
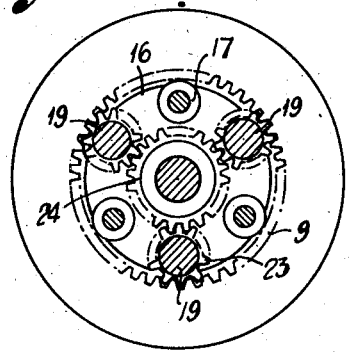
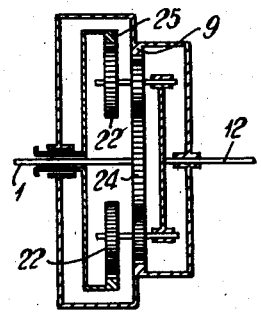
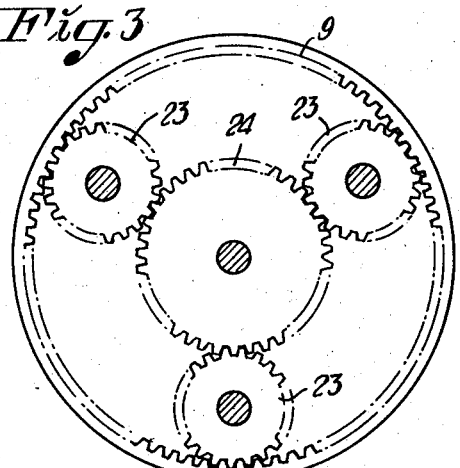
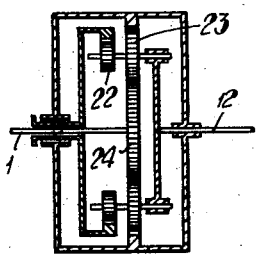
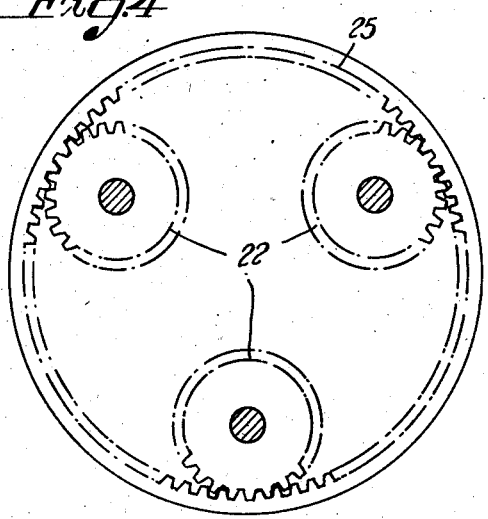
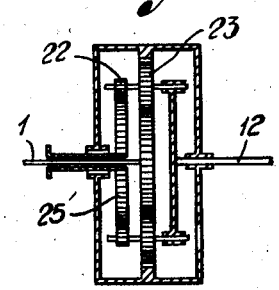

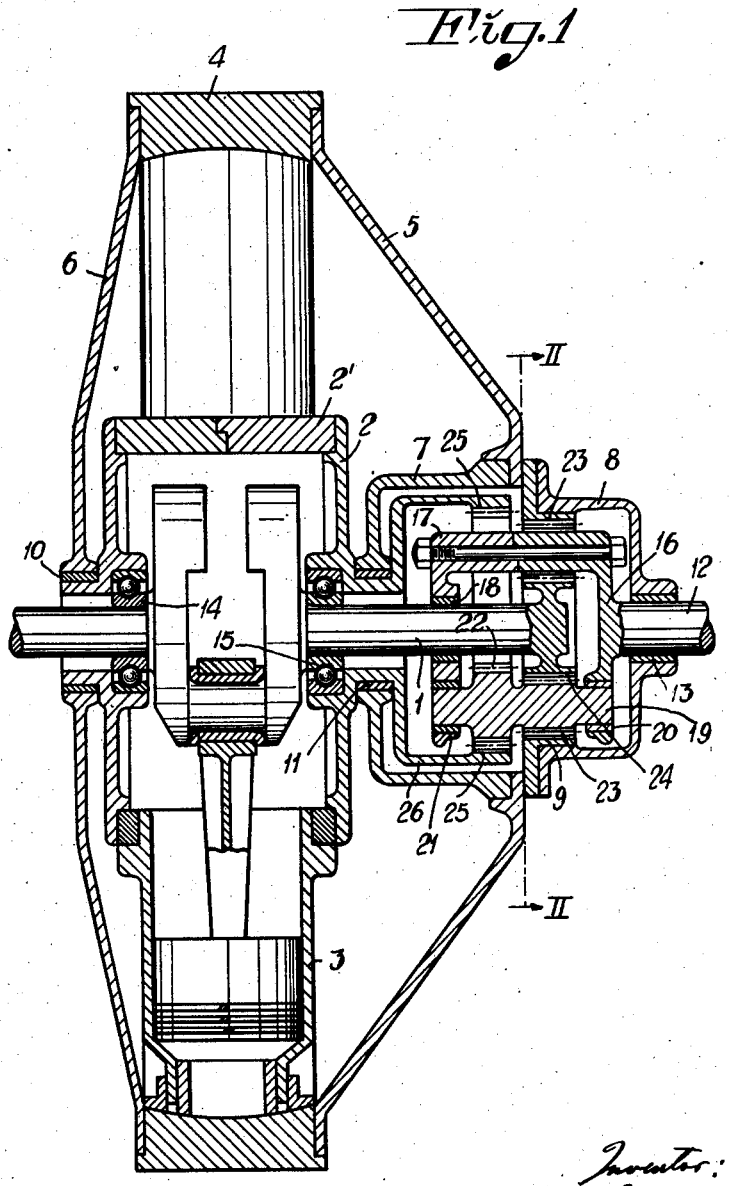

Patented Feb. 24, 1942

2,273,900

UNITED STATES PATENT OFFICE 2,273,900

INTERNAL COMBUSTION ENGINE

Ignac Sklenár, Paris, France, assignor of two-thirds to Nils Gustaf Hezekiel Frenne, Stockholm, Sweden Application February 2, 1938, Serial No. 188,306
In Sweden February 5, 1937

2 Claims. (Cl. 123—44)

The present invention refers to a transmission arrangement intended for combustion engines and compressors. It is especially suitable for use in connection with star engines, namely, engines having their cylinders arranged in the shape of a star and all connecting rods connected with a crank shaft, whose rotation axis passes through the center of the star. Engines of this type are frequently referred to in the industry as bi-rotary engines.

The invention is primarily characterized by the arrangement of a single transmission for transmitting the motion from the crankshaft to the outgoing or power output shaft and the timing device of the engine or to the cylinders, for instance, planetary transmission, with only two planetary gears connected with one another from each planetary gear shaft. If, for instance, the engine is made in such a manner that in addition to the crankshaft the cylinders also rotate, while the timing device or devices are stationary, the motion is transmitted from the crankshaft to the outgoing shaft or from the crankshaft to the cylinders by means of the same transmission. The invention can, however, also be applied if the cylinders are stationary while, on the other hand, the timing devices are movable. The first solution, the movable cylinders, can be made use of in connection with a star engine and the latter, for instance, with an engine with cylinders in line.

When the invention is applied to planetary transmissions, the motion of the crankshaft is transmitted to the power output shaft through a planetary gear, with the same planetary motion, arranged, for instance, on the same planetary gear shaft as the planetary gear which transmits the motion from the crankshaft to the timing device or cylinders.

The annexed drawings show embodiments of the application of the invention.

Fig. 1 shows a longitudinal section of a star engine, which is provided with the transmission device considered here;

Fig. 2 shows a cross-section of the transmission device, according to the lines II—II of Fig. 1 on the same scale;

Figs. 3 and 4 show diagrammatically by indicating the segments, two sections of a transmission device developed in the same manner, on a scale twice as large as compared to Figs. 1 and 2;

Fig. 5 shows diagrammatically the transmission device contained in Fig. 1 in axial section; and Figs. 6 and 7 show in the same way embodiments modified to some extent.

The engine shown in Figs. 1 and 2 is of a special type, provided with a sliding ring. The engine shown is assumed to be a 4 cycle engine. 1 indicates the crankshaft of the engine, 2 the rotating cylinder bank including a crank case to which the cylinders 3 have been connected. 4 indicates, as timing device of the engine, a sliding ring which, in this case, is assumed to be stationary. 5 and 6 indicate the front and rear parts of the case which, with the sliding ring, is contained in the stationary part of the engine. With this part, cases 7 and 8 and a gear 9 are connected. In these non-rotating parts, the crank case 2 is mounted in slide bearings 10 and 11, and the power shaft 12, which in the case of an engine is a power output shaft and in the case of a compressor is a power input shaft is mounted in sliding bearing 13.

In the crank case 2, the crankshaft 1 is mounted in ball bearings 14 and 15.

The motion of the crankshaft 1 is now transmitted according to the invention, to the outgoing shaft or to the rotating crank case supporting the cylinders by means of a single transmission namely a planetary transmission in the embodiment shown contained in one of the aforementioned cases 7 and 8. This transmission consists, in addition to the above mentioned crown gear 9, of a part 16, which is firmly connected with the outgoing shaft or made integral with same, and a part 17 keyed on to same, and of the corresponding pinion. The parts 16 and 17 together provide a planet carrier in the form of a box or case rotatably supported on the crankshaft at bearing 18 and supporting three planetary gear shafts 19 in slide bearings 20, 21. Each planetary gear shaft 19 is provided with a compound planet consisting of two planet pinions 22, 23. On the end of the crankshaft, which enters the planetary gear case there is fastened or formed the gear 24, that is, the driving or sun gear of the planetary transmission, which meshes with planetary pinions 23. Crown gear 9, with internal teeth, which is firmly connected with the non-rotating parts 5, 7, 8, also meshes with planetary gears 23. The other pinions 22 of the compound planets mesh with the internal teeth of crown gear 25, which, by means of case 26, supporting same, is firmly connected with cylinder bank 2, and hence 25 may be termed a cylinder gear.

In Figs. 3 and 4 the sections through gears 22, 23, 24 and through gears 9 and 25, are illustrated.

In order to facilitate by a suitable example the description of the operation of the transmission, it is assumed that the transmission is intended for a 9 cylinder sliding ring engine and that gears 22 have 30 teeth each, the gears 23, 20 teeth each, the gear 24, 40 teeth, the gear 9, 80 teeth and the gear 25, 90 teeth.

Let us assume that the pinion 24 rotates and the crown gear 9 is stationary (Fig. 3). The ratio of transmission to the planet carrier 16, 17 and, with it, to shaft 12, viz. the transmission ratio between the crankshaft 1 and the outgoing shaft 12, has the following values:

$$\frac{40}{40+80} = \frac{1}{3}$$

Shaft 1 thus has an R. P. M. which is three times as high as the shaft 12.

Let us assume further that the planet carrier rotates and the crown gear 9 is stationary. The transmission ratio between the shaft 12 and crown gear 25 has the following value:

$$1 - \left(\frac{80}{20} \cdot \frac{30}{90}\right) = -\frac{1}{3}$$

The shaft 12 consequently has an R. P. M. three times as high as that of the cylinder star 2, 2'. Consequently, crankshaft 1 has an R. P. M. 9 times as high as that of the cylinder star, while the crankshaft and the cylinder star, as indicated by the sign (—) have opposite directions of rotation.

The above mentioned direction of rotation is obtained if the gears have the same size ratio with respect to each other, as appears from Fig. 5. It appears here that the diameter of gear 22 is greater than that of gear 23.

The cylinder star can also receive a rotating motion, which has a direction in the same sense as that of the crankshaft. This occurs, if gear 22 has a smaller diameter than gear 23. An example of this is shown in Fig. 6. Motion in the same sense can also be obtained by permitting the planetary gears 22 to engage with gear 25', provided with teeth on the outside and connected with the cylinder star. This case is explained by Fig. 7.

The invention is naturally not limited to any special transmission ratios and the above mentioned embodiments are given only by way of illustration.

In other words, the invention is not limited to the cases described here by way of example. It can also be used with engines, which are not provided with a sliding ring, but with one cam disc common for the cylinders, which, in such case, receives its motion from the rotating part 26, which in the above-given example imparts the motion to the crank case. The invention can also be applied to 2 cycle engines and compressors and for other purposes in which three different rotating motions are mechanically connected with each other.

Motion-transmitting devices other than the gears can also be used.

Finally the application of the invention even in cases when both cylinders and their timing device are movable can be assumed.

I claim:

1. In a bi-rotary engine, the combination with a crankshaft member, a rotatably mounted cylinder bank member and a rotationally stationary timing member, of a planetary gearing unit interconnecting said members in desired phase relation and speed of operation with respect to each other, said gearing unit comprising a sun gear on said crankshaft member, a stationary gear on said timing member, a rotatably mounted planet carrier, a first set of planets mounted on said carrier each meshing with said sun gear and said stationary gear, a cylinder gear on said cylinder bank member and a second set of planets on said carrier, the planets of said second set being connected to the planets of said first set so that the planets of both sets are constrained to turn about their respective axes at the same speed and to rotate about the axis of said planet carrier at the same speed, the planets of said second set meshing with said cylinder gear and the planets of one set having a diameter different from that of the planets of the other set, whereby to cause said cylinder bank member to rotate whenever the crankshaft member is rotated and to determine both the relative speed of rotation and sense of direction of rotation between the crankshaft member and the cylinder bank member in accordance with the relation between the diameters of the planets of said first and said second sets.

2. In a bi-rotary engine, the combination with a crankshaft member, a rotatably mounted cylinder bank member, a rotationally stationary timing member and a rotatably mounted power output member, of a planetary gearing unit interconnecting said members in desired phase relation and speed of operation with respect to each other, said gearing unit comprising a sun gear on said crankshaft member, a stationary gear on said timing member, a rotatably mounted planet carrier, said planet carrier being connected to and driving said power output member, a first set of planets mounted on said carrier each meshing with said sun gear and said stationary gear, whereby to cause said planet carrier and power output member to be rotated at a speed lower than that of said sun gear and to determine the relation between the speed of said crankshaft member and the speed of said power output member by the relation between the diameters of said sun gear and said planets, a cylinder gear on said cylinder bank member and a second set of planets on said carrier, the planets of said second set being connected to the planets of said first set so that the planets of both sets are constrained to turn about their respective axes at the same speed and to rotate about the axis of said planet carrier at the same speed, the planets of said second set meshing with said cylinder gear and the planets of one set having a diameter different from that of the planets of the other set, whereby to cause said cylinder bank member to rotate whenever the crankshaft member is rotated and to determine both the relative speed of rotation and sense of direction of rotation between the crankshaft member and the cylinder bank member in accordance with the relation between the diameters of the planets of said first and said second sets.

IGNAC SKLENÁR.